April 4, 1939.    L. SANDLER    2,153,397

MACHINABLE SINTER BEARING

Filed Oct. 15, 1937

*INVENTOR.*
*Louis Sandler*
BY Richard S. Harrison
*his* ATTORNEY.

Patented Apr. 4, 1939

2,153,397

UNITED STATES PATENT OFFICE

2,153,397

MACHINABLE SINTER BEARING

Louis Sandler, New Castle, Pa., assignor to Johnson Bronze Company, New Castle, Pa., a corporation of Pennsylvania Application October 15, 1937, Serial No. 169,114

9 Claims. (Cl. 308—240)

My invention relates to bearings, relating in particular to the so-called sleeve bearing or bushing composed of porous alloy but is not confined thereto.

Porous alloy bushings are produced by compressing metal powders in a die, sintering in a furnace at approximately ⅔ the melting point of the highest melting point metal in the mix and then filling the supply voids or channels in the bushings with oil. In a majority of cases, the mixture consists of copper, tin and graphite powders. In the furnace the tin melts, soldering and alloying with the copper. The porosity may be controlled by varying the compressing ratio and by introducing a volatile compound into the mix. Roughly, the density of such compressed powder pieces will be in the vicinity of 6 gm./cc., while cast bronze may be, roughly, 8.3 gm./cc. The difference in density is due to graphite and voids.

Such bushings when pressed or heated sweat oil on their surfaces, this oil coming from the oil-filled cells within the bushing body.

It can be readily seen that anything tending to close the surface pores would destroy the self-oiling features. Consequently, any machining operation such as reaming would tend to smear the metal, thereby closing the pores, making the oil reservoir in the bushing useless, being closed off at its entry point at the surface of the bearing and the shaft.

In actual practice, after the shaft tends to wear the bushing, the rubbing action tends to close up the pores at the surface, thereby closing the entry of the oil to the shaft and destroying the value of the bushing due to the fact that the oil pores become closed by such rubbing action. When this occurs, the bushing begins to squeak and this tends to destroy the usage of this particular bearing. A bearing that could be machined and where part of the channels at the bearing surface would not be closed, due to machining or wear, would greatly widen the field of application and increase the general utility of this bearing.

It is the principal object of this invention to produce a bearing as will overcome the above defects. Another object is to provide such bearings as inexpensively as possible.

The theory briefly is—if shallow oil grooving or recessing be pressed into the bearing on initial compression, the bearing surface will consist of alternate projections and recesses. The actual bearing surface will be on the projections. Consequently, any machining or smearing action will affect these and not the recesses. Due to the high heat conductivity of bronze, the entire bearing heats uniformly when in use, therefore, the oil will be excluded from the recesses and conveyed up to the shaft by capillary action.

This oil grooving is accomplished by using a spirally operated grooved core rod in the mold or die. It is necessary to have this grooving at an angle inside the bearing so that at no time will the machining tool rest in the recesses. I find an angle of approximately 7°, more or less, satisfactory.

When making such a bearing with a spirally grooved core rod, it follows that the core rod must be turned through this angle when it is withdrawn; otherwise, the projections pressed onto the bearing would be torn off.

After the molding is accomplished, the bearing is treated as the ordinary type of porous alloy bushing.

The most important feature and object of my invention resides in the permanent porosity and reproduction given the sleeve casting surface portion so that reproduction will always be positive.

In the accompanying drawing, forming a part of this specification, I have illustrated a form of sleeve bearing or bushing best adapted to carry out my invention but do not confine myself to such form. In said drawing—

Figure 1:
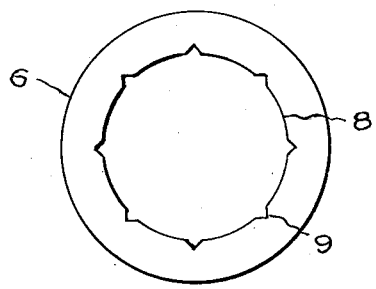
Figure 1 is an end elevation of a sleeve bearing constructed in accordance to my invention.
Figure 2:
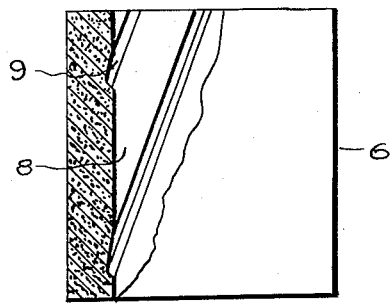
Figure 2 is a side elevation of same.

The sleeve 6, as previously stated, is formed of suitable porous bearing alloy pressed into a mold, not shown, having a removable grooved core, not shown, to form spirally disposed, alternate ribs or bearing surfaces and voids 8 and 9, respectively, in the bearing surface proper as oil distributing outlets from the pores of the alloy to the bearing surface.

Removal of the core will, as apparent, necessitate giving the same a spiral motion during such removal sufficient to prevent injury to the bushing.

The spiral form of bearing surfaces and voids are preferable, but other forms will also give good results, and be within the scope of my invention.

In machining the sleeve, the bearing surface of the projections are reduced by means of a reamer, or other suitable tool, it being apparent that the porous walls of the channels through which the lubricant is fed to the bearing surface will not be disturbed or acted upon, but will retain their mold or die finish. Such reaming may be repeated as often as required.

Having shown and described my invention, what I claim and desire to secure by Letters Patent, is—

1. A sinter bearing comprising a porous metal member provided in its bearing surface proper with a plurality of parallel longitudinally disposed channels communicating with the bearing pores, the walls of said channels being mold finish.

2. A sinter bearing comprising a porous metal member provided in its bearing surface proper with a plurality of parallel channels in communication with the pores of the member, the walls of said channels being mold finish.

3. A sinter bearing comprising a porous metal member provided in its bearing surface proper with a plurality of parallel spirally disposed channels alternating with parallel bearing projection, the channel being in direct communication with pores of the member and of mold finish.

4. A sinter bearing sleeve comprising a sleeve-like member of porous metal having its bearing surface formed into continuous alternating projection and oil channels, said channels being mold finished and in direct communication with the sleeve pores.

5. A sinter bearing sleeve comprising a sleeve-like member of porous metal having its internal bearing surface proper divided into a plurality of bearing parts with channels between them, the channels communicating with the pores of the member, said channels having walls of mold finish.

6. A sinter machinable bearing comprising a porous sleeve bearing formed of sinter metal the bearing portion proper being divided into a plurality of alternate projections and the channels being of substantially V shape with mold finished walls.

7. A porous sleeve bearing wherein the bearing surface is provided with a plurality of spaced longitudinal channels extending the length thereof, the bearing surface proper being located between the channels, the walls of the channels being porous and mold finish.

8. A molded sinter sleeve bearing having therein a plurality of longitudinally disposed oil reservoirs of V shape in cross section and extending from end to end, the walls of the reservoirs being of mold finish and the reservoirs being angularly arranged with respect to the axis of the sleeve.

9. A porous metal mold-formed bearing member having a plurality of spaced cast-finished oil feed channeled reservoirs in the bearing surface thereof.

LOUIS SANDLER.